(12) United States Patent
Pérez

(10) Patent No.: US 7,121,522 B2
(45) Date of Patent: Oct. 17, 2006

(54) DEVICE FOR THE REGULATION OF FLOW APPLIED TO FLOW VALVES WORKING UNDER PRESSURE DIFFERENTIAL

(76) Inventor: Sergio Pérez, Carlos Alvarado 5321, Las Condes, Santiago (CL)

( * ) Notice: Subject to any disclaimer, the term of this patent is extended or adjusted under 35 U.S.C. 154(b) by 45 days.

(21) Appl. No.: 10/766,856

(22) Filed: Jan. 30, 2004

(65) Prior Publication Data
US 2005/0167624 A1  Aug. 4, 2005

(51) Int. Cl.
*F16K 31/12* (2006.01)
(52) U.S. Cl. .......................... 251/39; 251/29
(58) Field of Classification Search ............... 251/25, 251/28, 31, 33, 35, 36, 38, 43–46, 61, 61.2, 251/282; 137/514.3
See application file for complete search history.

(56) References Cited
U.S. PATENT DOCUMENTS

| | | | | |
|---|---|---|---|---|
| 882,944 | A * | 3/1908 | Haas | 251/42 |
| 2,573,369 | A * | 10/1951 | Snoddy | 251/30.05 |
| 3,459,403 | A * | 8/1969 | Royer | 251/34 |
| 3,712,578 | A * | 1/1973 | Dawson | 251/35 |
| 3,735,772 | A * | 5/1973 | Hunter et al. | 137/15.19 |
| 4,135,696 | A * | 1/1979 | Saarem et al. | 251/30.02 |
| 5,067,516 | A * | 11/1991 | Gale | 137/414 |
| 5,213,124 | A * | 5/1993 | Costa | 137/1 |
| 5,738,332 | A | 4/1998 | Perez Corbalan | |
| 5,769,387 | A | 6/1998 | Perez C. | |
| 6,102,366 | A | 8/2000 | Perez C. | |

* cited by examiner

*Primary Examiner*—Edward K. Look
*Assistant Examiner*—John K. Fristoe, Jr.
(74) *Attorney, Agent, or Firm*—Shlesinger, Arkwright & Garvey LLP

(57) ABSTRACT

A device for regulating flow comprises a main valve operating under differential pressure wherein the main valve has a main flow inlet and a main flow outlet. The main flow inlet is equipped with a valve seat over which a main shutter is adjusted in a perpendicular direction to its shuttering plane. The main shutter has a hole on its locking face communicating with a pressure chamber disposed above the main shutter. A secondary control valve regulates small flows through the hole so as to create greater or less pressure within the pressure chamber to close or open the main shutter.

6 Claims, 7 Drawing Sheets

DEVICE FOR THE REGULATION OF FLOW APPLIED TO FLOW VALVES WORKING UNDER PRESSURE DIFFERENTIAL

FIELD OF THE INVENTION

This invention refers to flow regulating devices offering a great operating flexibility, which may be applied to flow valves working under differential pressure and which are preferably commanded by small flows of control or other systems requiring them.

BACKGROUND OF THE INVENTION

From among the large range of valves for flows commanded by pressure differences, which work by transferring control flows and which may regulate flows, the following documents of patents may be mentioned: U.S. Pat. No. 5,738,332 and U.S. Pat. No. 5,769,387 by S. Pérez, the same inventor of this device.

S. Pérez's U.S. Pat. No. 5,738,332 patent discloses a main valve with a flow regulating device consisting in a secondary control valve, which may be a valve of any state of the art and allowing a preset regulation of the flow between a minimum closed position and a maximum opened position. These secondary control valves allow a restricted preset regulation of the flow of the main valve, since for setting any flow for the main valve, the secondary control valve should be operated, thus gradually defining a new flow from the initially regulated flow up to the new flow required. In addition, these devices do not allow operating the main valve from pressures which are slightly over to zero pressure, because the restitution force of the main valve's shutter is to be overcome, especially when pressure in the system is low. Patent U.S. Pat. No. 5,769,387 by S. Pérez, discloses a main valve where regulating and/or controlling devices may be installed, which are arranged at the inlet of control flow, at the outlet of the control flow or both. These regulating and/or controlling any flow at the main valve, the control or regulation devices should be operated in order to define a new flow gradually from the flow initially regulated to the new flow required. In addition, these devices do not allow operating the main valve from low differences of pressure between the inlet and the outlet of the main valve, which may determine control forces which are not enough to overcome the restitution force of the main valve's shutter, while maintaining in these cases the main valve closed.

SUMMARY OF THE INVENTION

This invention, on the contrary, offers flow regulating devices for the main valve with a greater flexibility and versatility of operation and which require low operating power. They also have a simple design and little components, which make in some cases possible the manufacture of valves that may operate with a control flow under small pressures differentials (near zero pressure) and which may operate under system's pressures near zero and even with slightly negative pressures (vacuum) or at high pressures.

The flow regulating devices of the invention basically consist in secondary control valves which regulate small flows of control between a minimum closed position and a maximum preset opened position, so that this control flow may act over the pressure chamber of the main valve and over the main shutter thereof, regardless that the shutter of the main valve may be associated to a diaphragm, plunger, bellows or another supplementary element.

Commands for the flow regulating devices of this invention allow regulating the flows of the main valve in an almost instantaneous way under a command. These devices may be applied both to valves of the type requiring further action of command in order to bring them to the closed condition, as well as to valves of the type not requiring an additional action of command to bring them to the closed condition, with the interruption of the first action of command being enough in this case. These valves shall be called "automatic closing valves". For certain industrial applications, a "valve of automatic maximum opening" may be necessary, that is to say, when the action of command applied to set an intermediate flow ceases, the valve becomes completely opened, this resulting from the simple variation applied to the devices of the "automatic closing valves", as explained below.

Due to their configuration, these flow regulating devices may be operated with operating powers below those required for other devices of the state of the art.

The flow regulating devices of this invention may be applied to any main valve which jointly or separately may:
(a) operate with a differential pressure commanded by small flows of control;
(b) have inlets and outlets for the main flow designed in any direction and shape, and/or
(c) have any kind of inlet for the control flow into the pressure chamber of the main valve: (c1) from upstream through the inside of the main valve, or (c2) directly from upstream by the outside of the main valve already operated;
(d) have any kind of outlet for the control flow into outside:
 (d1) through the inside of the main valve downstream, or
 (d2) from the main valve downstream through a discharge line.
(e) have the shutter of the main valve associated with a plunger means, a diaphragm means, a bellow means or other means which may de fine a variable volume pressure chamber with axial displacement of its main shutter.

The devices of the invention allow developing interesting products in order to protect the environment, such as free-hands systems for the control of water, which may be used for personal cleaning, washing, preparation of foodstuffs, commercial, industrial uses, etc., thus producing water savings of up to 40% or more, reducing the pollution of sewage and the cost of treatment thereof. Other products which may be manufactured with the device of this invention may consist in: pressure governors of a significantly reduced size as compared with the current governors; safety valves; solenoid valves; automatic irrigation systems; etc.

BRIEF DESCRIPTION OF THE DRAWINGS

Below, a detailed description of the invention is shown backed up by figures, where:

FIGS. 1 and 2 show a portion of the main valve 1, where the device of the invention is shown built-in according to a first modality.

DETAILED DESCRIPTION OF THE INVENTION

Figure 1:
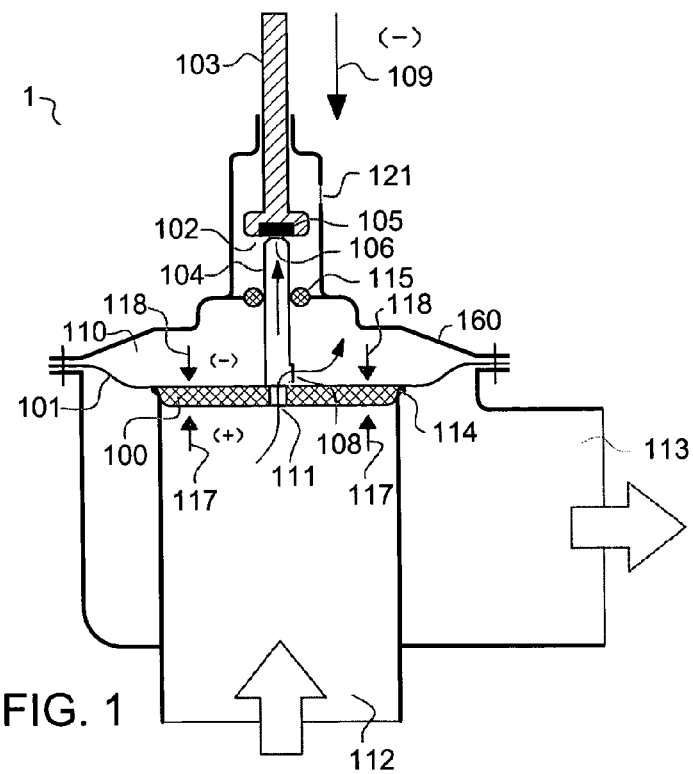
FIG. 1 shows a cross-section exploded top view of a first modality of the device of the invention applied to a valve, which is shown closed, with this kind of valve being of the type which operates under differential pressure and having a shuttering element in the main valve associated with a diaphragm.

The main valve 1 is a valve operating under differential pressure and it has a main flow inlet 112 and a main flow outlet 113. The main flow inlet 112 is equipped with a valve seat 114 over which a main shutter 100 is adjusted likely to shift in a perpendicular direction to its shuttering plane, which shall be defined as "axial direction". On its shuttering face, the main shutter 100 has a hole ill allowing the entering of the main flow from the inlet 112 to a pressure chamber 110.

The pressure chamber 110 is defined by a variable volume which is located over the main shutter 100 and which is confined between the main shutter 100, a diaphragm 101 which extends outwards radially from the perimetrical contour of the main shutter 100 up to an upper area 160, which is substantially rigid and which is over and axially separated from the shutter 100 in such a way that the perimetrical edge of the diaphragm 101 is tightly joint to the perimetrical edge of the upper area 160.

According to this first modality, the device of this invention consists in the means which are directly and indirectly associated with the main shutter 100, which means consist in a hollow axial stem 104 opened in its two ends and which bottom is joined to the center of the main shutter 100, so that a permanent communication of the main flow is admitted from the inlet 112, going through the hole 111 in order to receive the same in the hollow inside of said hollow axial stem 104. The upper end of the hollow axial stem 104 goes through the upper area 160 through a hole in its apex and where the sealing means 115 can be found to keep a tight ratio in the pressure chamber 110. This in turn allows the free axial displacement of the hollow axial stem 104. Over the sealing means 115, the valve has one or more hoses for the discharge of control flow 121, thus releasing it to the outside. The hollow axial stem 104 has an opening 108 to the pressure chamber 110 in a location which can be found below the plane defining the base of the upper area 160 so as to prevent the main flow from leaking through said opening 108 when the main shutter 100 is in an end opened position.

The upper end of the hollow axial stem 104 defines a secondary control valve seat 106, which is likely to be blocked by the shutter of a secondary control valve 105, located in the lower end of an axial command stem 103, which is axially aligned over said end of the secondary control valve 106, although this blocking may be done through a stem or lever of an angular movement or parallel to the axial axis of the main valve, which is likely to be blocked with the shutter of the secondary control valve 105 against the seat of the secondary control valve 106.

The area of the hole section 111 of the main shutter 100 is lower than the area of the opening section of the seat of secondary control valve 106, so that when maximum discharge is commanded in the secondary control valve 102, the total decompression of the pressure chamber 110 may be achieved.

By keeping a negative closing power 109 in the commanding stem 103, as shown in FIG. 1, the shutter of the secondary control valve 105 closes the outlet hole of flow of the secondary control valve seat 106. Under this condition, a part of the main flow entering the main flow inlet 112 goes through the inlet hole of control flow 111 and from there through hole 108 into the pressure chamber 110. Since the outlet hole of control flow 106 is closed, the internal pressure is increased in the pressure chamber 110, thus setting a negative closing power 118 over the upper area of the diaphragm 101 and its main shutter 100, to which the negative power of restitution of diaphragm 101 characteristic of its design is added. Under these conditions, the addition of these negative powers is greater than the positive opening power 117 exerted on the lower area of the main shutter 100 of the main valve 1 and which is produced by the pressure of flow entering through the inlet of main flow 112, so as to get that the main shutter 100 keeps closed in relation to its closing seat 114, as shown in FIG. 1. In this condition, the lower area of the diaphragm 101, which communicates with the outlet of main flow 113 downstream, becomes exposed to a lower pressure than the upstream pressure, thus contributing the closing of the main valve 1.

In order to keep valve 1 as a permanently closed valve, the axial commanding stem 103 needs to be kept in an end low position, that is to say, so that the shutter of the secondary control valve 105 is blocking the opening of the secondary control valve seat 106. This may be achieved through such stem-fastening means as springs, threads, butts, etc.

Figure 2:
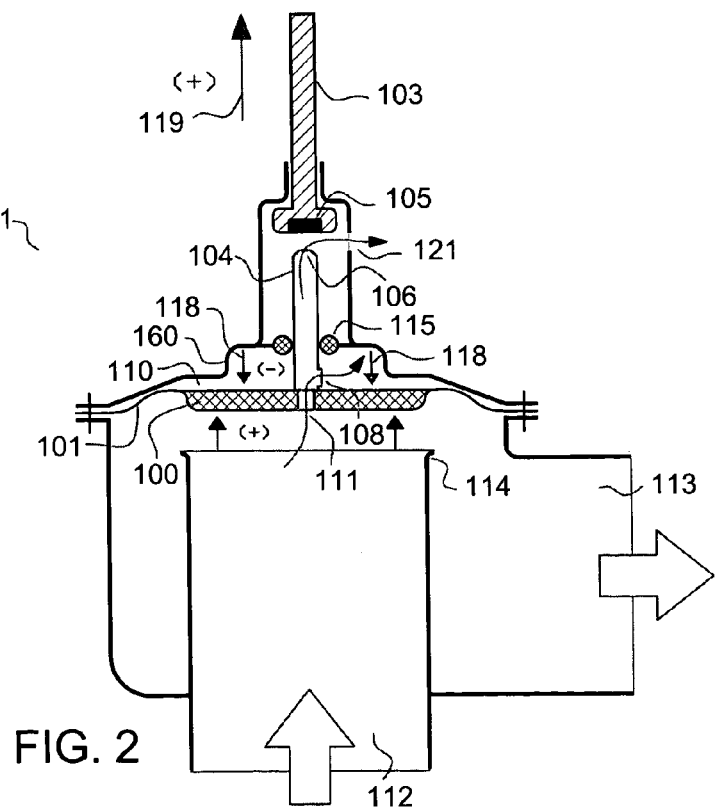
FIG. 2 shows the same valve as in FIG. 1 in opened position.

By applying a positive commanding power for opening 119 to the axial commanding stem 103 and with the shutter of the secondary control valve 105 moving away from its valve seat 106, as shown in FIG. 2, a discharge of control flow is produced through the hole of the secondary control valve seat 106, through which part of the flow is released to the pressure chamber 110, going from this to the hollow axial stem 104 through hole 108 and with the pressures of the pressure chamber 110 being reduced and, consequently, with the negative closing power 118 being also decreased, which causes the axial displacement of the main shutter 100, unblocking the valve seat 114 in order to allow the outflow of a certain amount of main flow from the main flow inlet 112 to the main flow outlet 113. In order to keep the passing condition of a preset flow, the commanding stem 103 needs to be kept in a preset position.

When an intermediate main flow is to be obtained, that is, greater than zero and less than the maximum flow, the upper end of the hollow axial stem 104 is out of touch with the shutter of the secondary control valve 105 and in a position of such axial displacement that the main shutter 100 is an intermediate position between a closed position and a maximum opened position. But this position of the hollow axial stem 104, which could be named "floating position", is not unstable, as a first impression would suggest. Indeed, in this "floating" situation, most of the main flow entering through the main inlet 112 is initially bypassed to the main outlet 113, going though the valve seat 114 which is opened, so that the entering and outflowing flows to and from the pressure chamber 110 tend to change. This variation is due to a feedback phenomenon of the axial displacement of the hollow axial stem 104 and of the main shutter 100 associated with it. This feedback is caused by successive decreases and increases of pressure in the pressure chamber 110 produced by differences in the flow released through the opening between the secondary valve seat 106 (axially displaced as an alternative) and the shutter of the secondary valve 105 (fixed in the situation stated here). Thus, in a first condition (in the position of discharging the intermediate main flow), the pressure in the pressure chamber 110 decreases coming nearer to the hollow axial stem 104 toward the shutter of secondary control valve 105, with which the amount of control flow removed decreases, thus increasing the pressure in the pressure chamber 110, since the flow entering there does not undergo any variation with the aforementioned alternative displacements of the hollow axial stem 104 (and the main shutter 100 associated therewith). These alternative displacements are quickly offset due to the huge difference existing between the sections through which the main flow goes through and the discharging sections of the control flow (rates about 1000:1) and due to the offsetting action generated by the distortion of the diaphragm 101 and the inertia of the main shutter 100.

Figure 3:
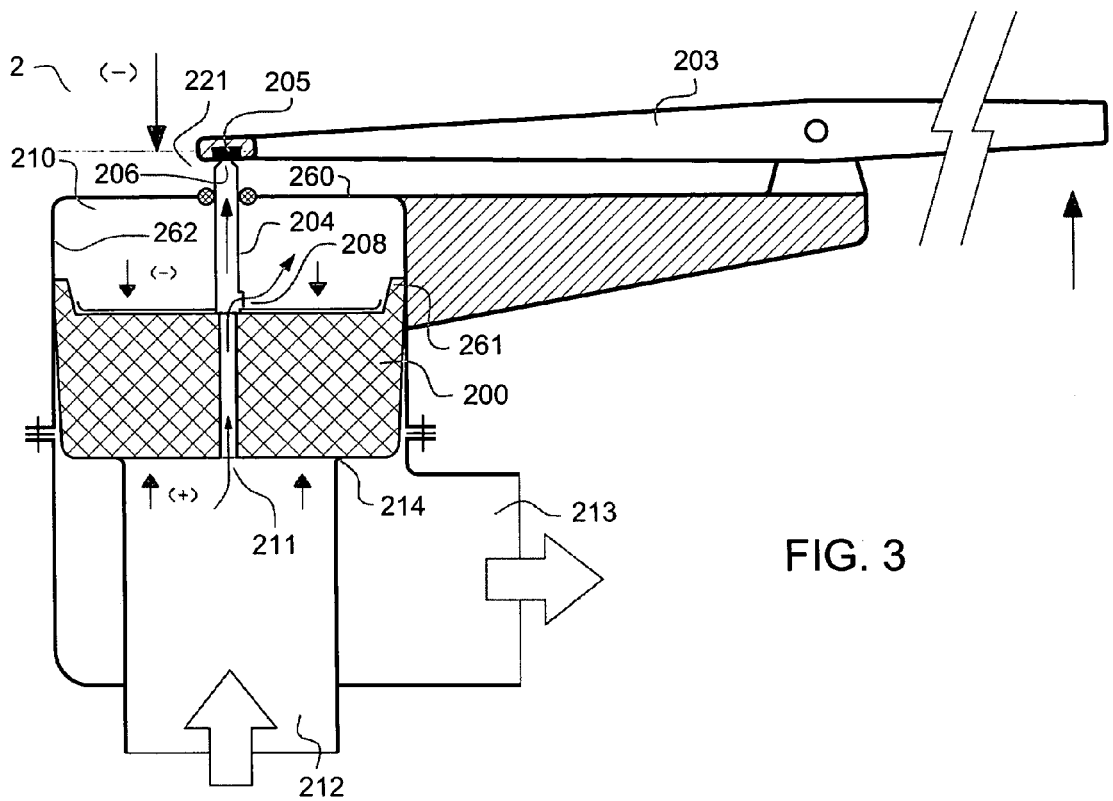
FIG. 3 shows a cross-section top view of a portion of the valve closed, where a first variant of the first modality of the device of the invention is applied, with this kind of valve being of the type which operates under differential pressure and consisting in a plunger.
Figure 4:
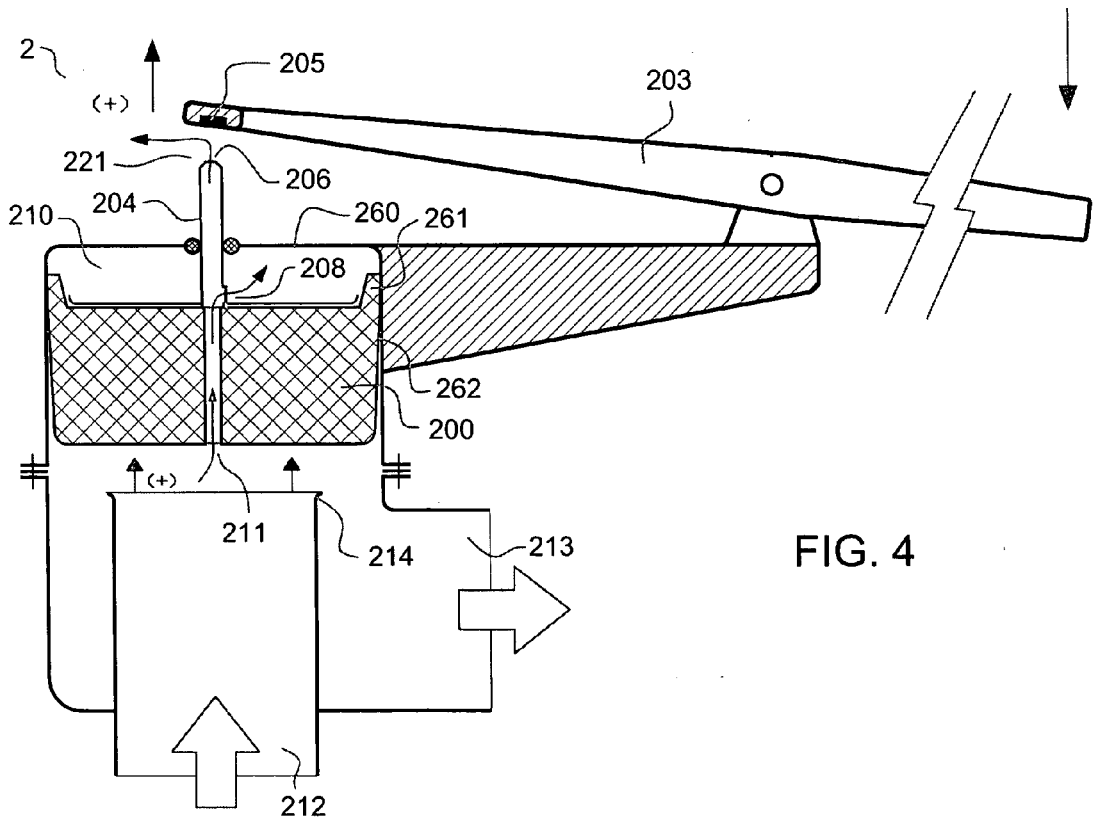
FIG. 4 shows the same application as in FIG. 3 showing the valve opened.

FIGS. 3 and 4 show a first variant of the first modality of the invention device made up by a main valve 2 with a main inlet 212 and a main outlet 213. This variant includes a main shutter 200 of the plunger type which axially displaces in an axial cylinder cavity 262. It is the lower face in this main shutter 200 the one exerting the blocking against the main valve seat 214. The main shutter 200 has a centered hole for the inlet of the control flow 211 and in its upper edge, it has a sealing edge 261 which seals the contact of it with the axial cylinder cavity 262, thus defining a pressure chamber 210 in the volume comprised between the axial cylinder cavity 262, the upper face of the main shutter 200 and an upper face of the axial cylinder cavity 262. The upper face of the main shutter 200 has an associated hollow axial stem 204 as the one already shown and described in relation to the variant of FIGS. 1 and 2, so that it has an opening 208 in its lower portion and its upper end projects beyond the upper face of the axial cylinder cavity 262, where a control valve seat 206 can be found. This control valve seat 206 is likely to be blocked through a shutter of the control valve 205 found in a commanding lever 203.

The operation of this variant is substantially similar to that described for the variant of FIGS. 1 and 2. However, since the main shutter 200 is of the plunger type, this second variant is simpler than the first one already described from the construction point of view. In addition and since the operation of the shutter of the secondary control valve 205 is performed through lever 203, the application of commanding power of substantially different magnitudes to those that should be applied by direct action, as in version of FIGS. 1 and 2, is possible.

Figure 5:
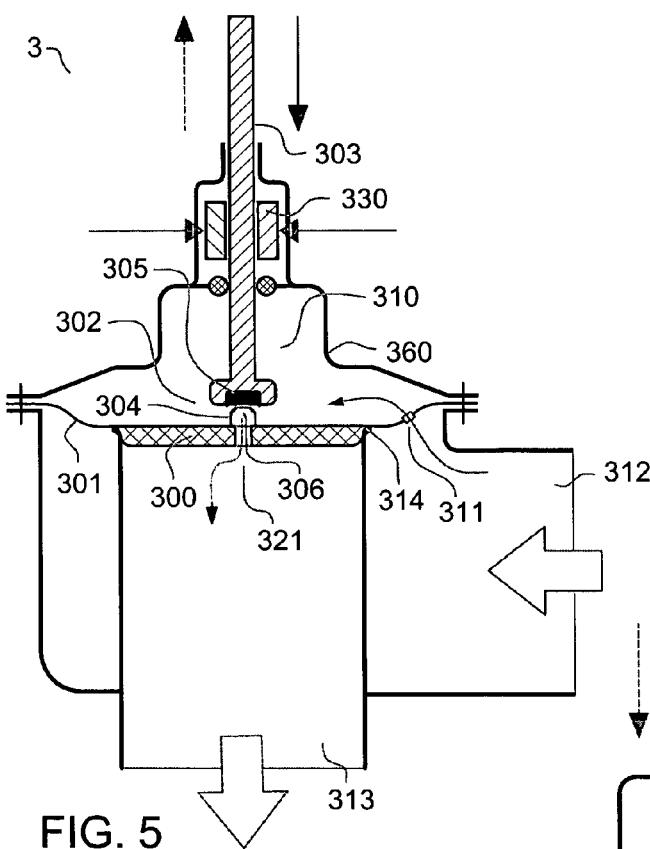
FIG. 5 shows a cross-section top view of a portion of the valve closed, where a second variant of the first modality of the device of the invention is applied, with this kind of valve being of the type which operates under differential pressure and having a shuttering element in the main valve associated with a diaphragm.

FIG. 5 shows a second variant of the first modality of the device of the invention incorporated to a main valve 3, which is depicted in closed position. In that variant, unlike the variant of FIGS. 1 and 2, the secondary control valve 302 is inside the pressure chamber 310, limited by the main shutter 300, the diaphragm 301 and the upper area 360. In this configuration, the control flow enters from the main inlet 312 to the pressure chamber 310 over an inlet hole for the control flow 311 located in the diaphragm 301. The pressure chamber 310 may discharge a control flow to the main outlet 313, going through the opening of the secondary valve seat 306—when its shutter 305 is separated from said secondary valve seat 306—and from there, the control flow outflows to the main outlet 313 going through the opening for the discharge of control flow 321 which can be found in the center of the main shutter 300. The axial commanding stem 303, at which lower end the secondary valve shutter 305 is found, is associated with braking means 330, which act in its perimetrical surface.

Braking means 330 may be passive or active, that is to say, they may be elements which increase friction in their contact areas or threads which control the displacement of the axial commanding stem 303, so that the application of an extra commanding power is needed to the axial commanding stem 303 in order to change its position. Otherwise, they may be externally actuating means (active), such as fastening cones, cams, etc.

The remaining operation of this variant is substantially similar to that of the previously described variants.

Figure 6:
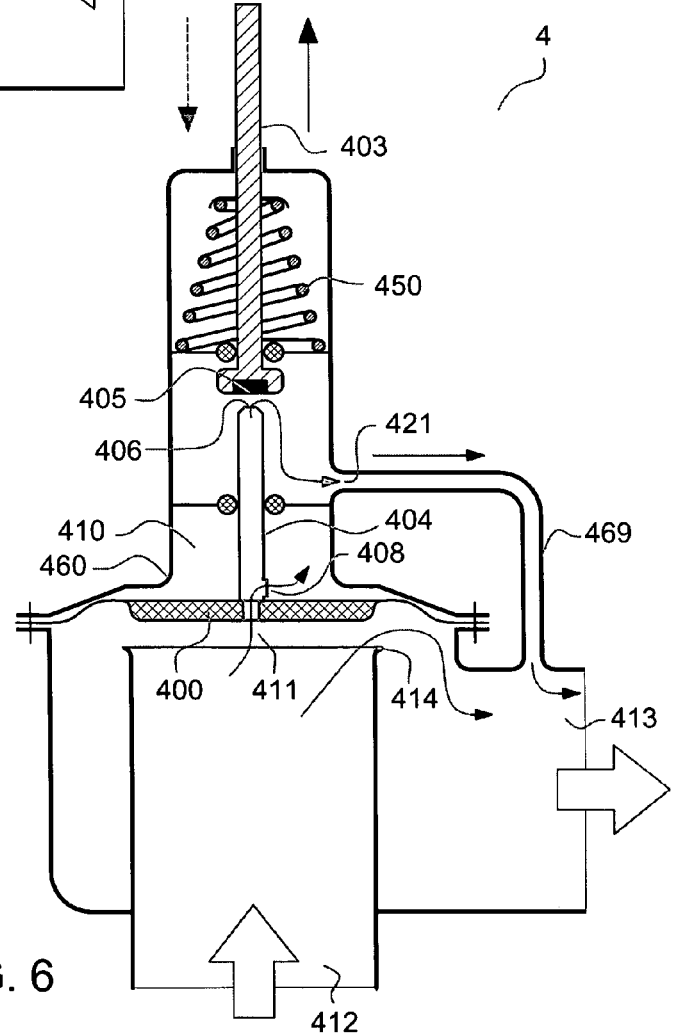
FIG. 6 shows a cross-section top view of a portion of the valve opened, where a third variant of the first modality of the device of the invention is applied, with this kind of valve being of the type which operates under differential pressure and having a shuttering element in the main valve associated with a diaphragm.

FIG. 6 shows a third variant of the first modality of the device of the invention incorporated to a main valve 4, which is depicted in opened position. In this variant, unlike the variant of FIGS. 1 and 2, the discharge hole for the control flow 421 communicates by a pipe 469 downstream the main outlet 413. The axial commanding stem 403 remains in an end position of opened valve by a spring 450.

The substantial difference between this variant and that of FIGS. 1 and 2 lies in the fact that this third variant of the device defines an automatic valve. This means that every time the commanding power performed on the axial commanding stem 403 ceases in order to define an intermediate flow or to close the valve, then the spring 450 displaces the stem 403, making the shutter of the secondary valve 405 to separate from the secondary valve seat 406, opening valve 4.

Figure 7:
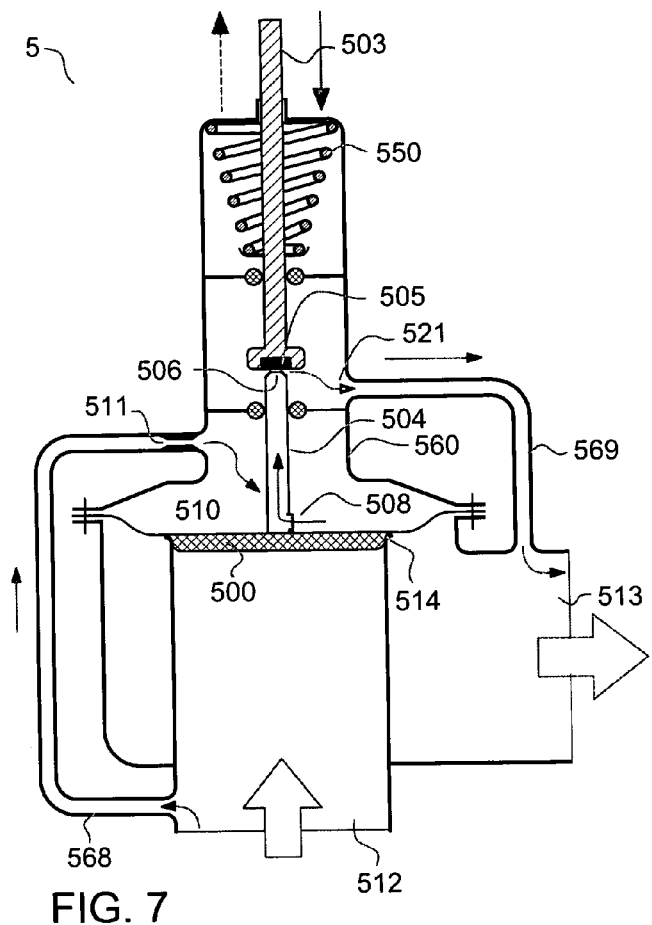
FIG. 7 shows a cross-section top view of a portion of the valve closed, where a fourth variant of the first modality of the device of the invention is applied, with this kind of valve being of the type which operates under differential pressure and having a shuttering element in the main valve associated with a diaphragm.

FIG. 7 shows a fourth variant of the first modality of the device of the invention incorporated to a main valve 5, which is depicted in closed position. In this variant, unlike the variant of FIG. 6, the inlet of control flow 511 to the pressure chamber 510 of the main valve 5 communicates by a pipe 568 upstream the main flow inlet 512. The axial commanding stem 503 remains in an end position of closed valve by a spring 550.

The substantial difference between this variant and that of FIG. 6 lies in the fact that this fourth variant of the device defines an automatic valve. This means that every time the commanding power performed on the axial commanding stem 503 ceases in order to define an intermediate flow or to open the valve, then the spring 550 displaces the stem 503 in the closing direction of the valve, making the shutter of the control valve 505 to close against the secondary valve seat 506, closing valve 4 similar to that explained in further detail as regards FIGS. 1 and 2.

Figure 8:
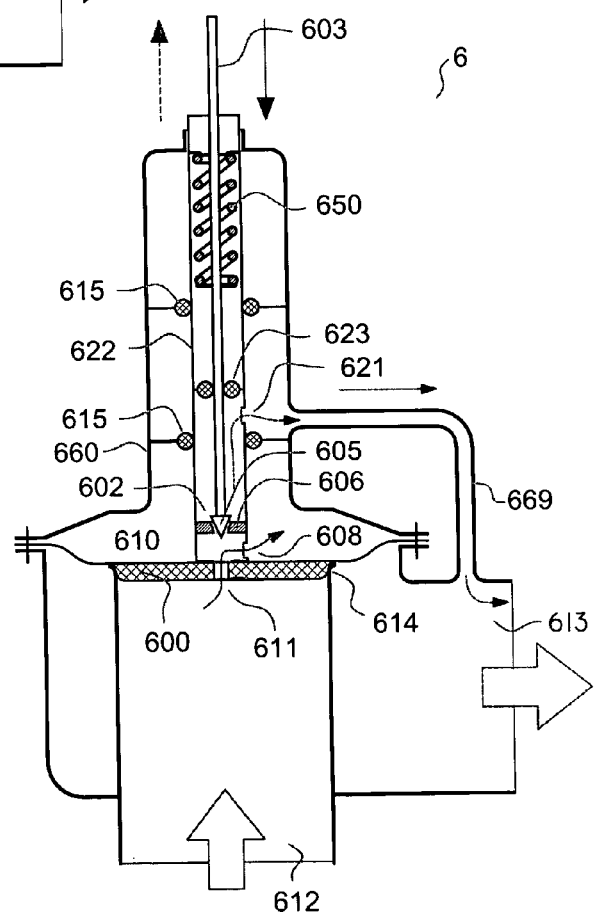
FIG. 8 shows a cross-section top view of a second modality of the device of invention applied to a valve shown closed, with this kind of valve being of the type which operates under differential pressure and having a shuttering element in the main valve associated with a diaphragm.

FIG. 8 shows a second modality of the device of the invention incorporated to a main valve 6, depicted in closed position. In this second modality, unlike any variant of the previous modality, the secondary control valve 602 is made up by a tubular external stem 622 and an axial commanding stem 603 substantially concentric to the tubular stem 622 and arranged in such a way that a portion of the commanding stem 603—including its lower end—is found inside the tubular stem 622, and the portion of the commanding stem 603—including its upper end—is found outside the upper portion of the tubular stem 622. The commanding stem 603 is supported inside the tubular stem 622 in a sliding and sealing relation through sealing means 623. In addition, the commanding stem 603 is related to the tubular stem 622 through a spring 650 which keeps the commanding stem 603 in an extreme position, which in the version of the modality shown herein, is an automatically closed position. An obvious variant of this would have the spring 650 keeping the commanding stem 603 in an automatically extreme open position.

The lower end of the tubular stem is related to the main shutter 600 with a hole 611 in a way similar to that already explained as regards modality of FIGS. 1 and 2 and also includes an opening 608 which communicates with a pressure chamber 610. In the lower end of the tubular stem 622 and over opening 608, a secondary valve seat 606 can be jointly found and in a cooperating relation with the shutter of a secondary valve 605 located jointly to the lower end of the commanding stem 603. In the tubular stem 622, between the seat 606 and the sealing means 623, a discharge opening is defined for the control flow 621 arranged in such a way that it never invades the pressure chamber 610.

The tubular stem 622 has a couple of external sealing means 615 where one of the external sealing means 615 allows isolating the pressure chamber 610 from the control flow discharge 621 and the other external sealing means 615 allows isolating the discharge of the control flow from the environment, since it may be discharged only through an outlet pipe 669 which discharges downstream.

Valve 6 of this modality is an automatic valve with an operation substantially similar to valve of FIG. 7. This means: every time the commanding power being exerted on the axial commanding stem 603 ceases in order to define an intermediate flow or to open the valve, the spring 650 displaces the stem 603 in the closing direction of the valve, thus making the shutter of the control valve 605 to close against the control valve seat 606, and closing valve 6 due to the pressure increase in the pressure chamber 610 as the result of the flow pressure entering through the hole 611.

Figure 9:
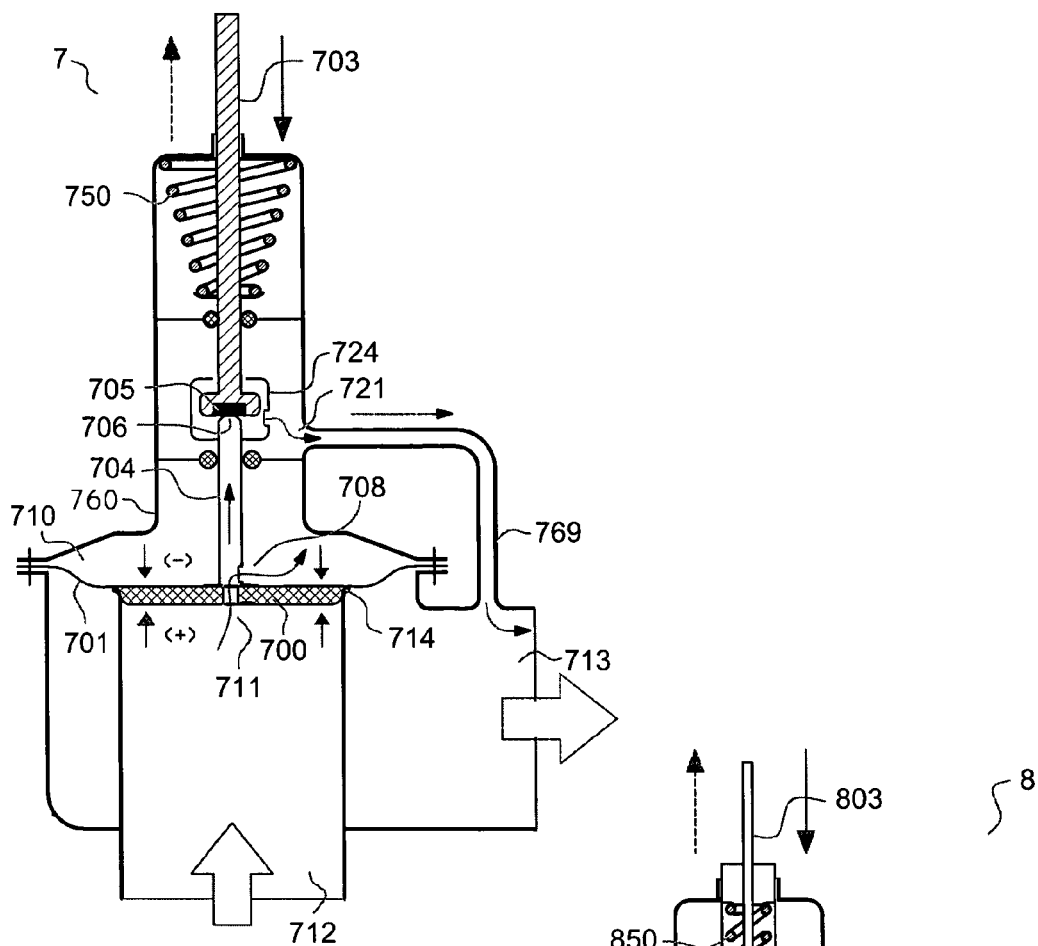
FIG. 9 shows a cross-section top view of a third modality of the device of invention applied to a valve shown closed, with this kind of valve being of the type which operates under differential pressure and having a shuttering element in the main valve associated with a diaphragm.

FIG. 9 shows a third modality of the device of the invention made up by a main valve 7 which is depicted in closed position. Unlike most versions of the first modality, this third modality shows an axial commanding stem 703 joint under a "restricted floating condition" to the hollow stem 704 through limiting means 724 which are integral part of the upper portion of the hollow stem 704 and which—within a preset axial range by design—holds the axial commanding stem 703 in a sliding condition. In this description, the expression "restricted floating condition" refers to the fact that the axial commanding stem may be displaced within a range without dragging the hollow stem 704 by mechanical contact and, beyond said range, the axial commanding stem 703 drags the hollow stem 704 by the limiting means 724.

The mechanical link exerted by the limiting means 724 is especially helpful when pressure differences between the main flow inlet 712 and the main flow outlet 713 are very small and tending to 0 differential pressures, since the positive opening power determined by this small differential is not enough to counteract the negative restitution power of diaphragm 701. In this condition, the resulting power exerted on the upper surface of diaphragm 701 (negative power) is greater than the resulting power exerted on the lower surface of shutter 700 (positive power). Consequently, even though the pressure chamber may be discharged as the result of the stem being displaced in its restricted floating range, said resulting negative power will keep the main shutter 700 in its closed position and the axial commanding stem is to be displaced until pulling the hollow stem 704 through the limiting means 724 in order to be able to open the shutter 700 to such an opening level which will depend on the additional displacement of the axial commanding stem 703, thus allowing the main valve operating under any pressure in the network, slightly over downstream pressure and including slightly negative pressures or high pressures.

Figure 10:
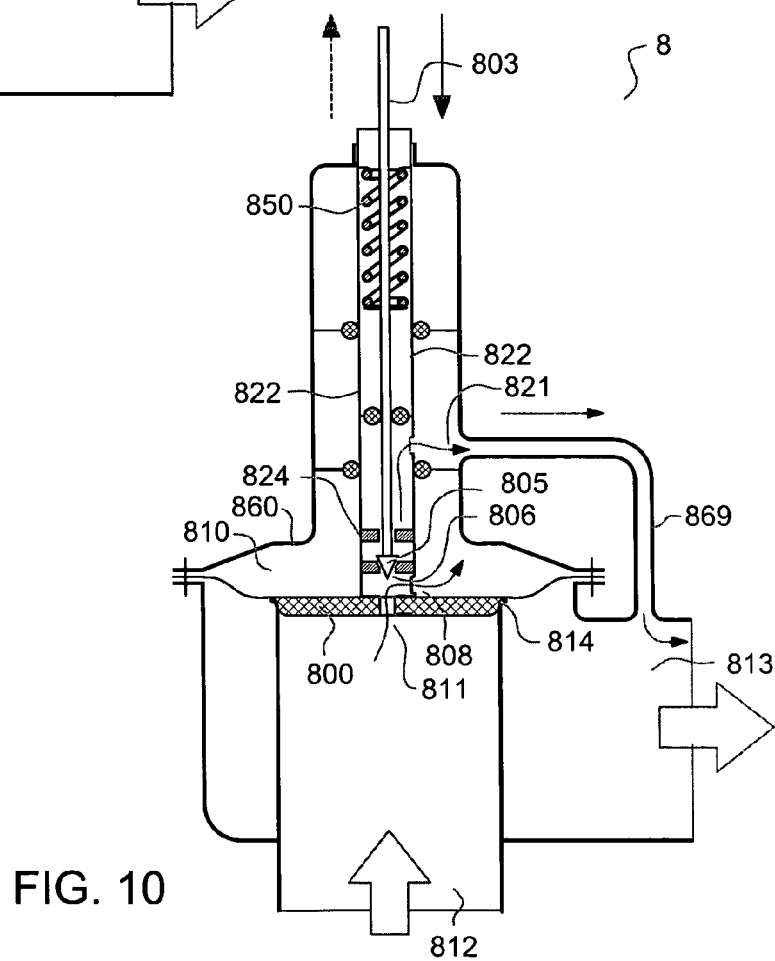
FIG. 10 shows a cross-section top view of a fourth modality of the device of invention applied to a valve shown closed, with this kind of valve being of the type which operates under differential pressure and having a shuttering element in the main valve associated with a diaphragm.

FIG. 10 shows a fourth modality of the device of the invention made up by a main valve 8, which is depicted in closed position. Unlike the second modality (FIG. 8), in this fourth modality the axial commanding stem 803 is joint under the "restricted floating condition" as defined in the previous modality, to the tubular stem 822 through limiting means 824 which are integral part of the lower portion of the tubular stem 822 and which—within a preset axial range by design—holds the axial commanding stem 803 in a sliding condition. This mechanical link 824 allows counteracting the restitution power of the diaphragm 801, acting in a similar way to the equivalent means of the third modality of FIG. 9, thus allowing commanding the opening of the valve in a regulating way even though with low pressure differentials tending to zero pressure.

Figure 11:
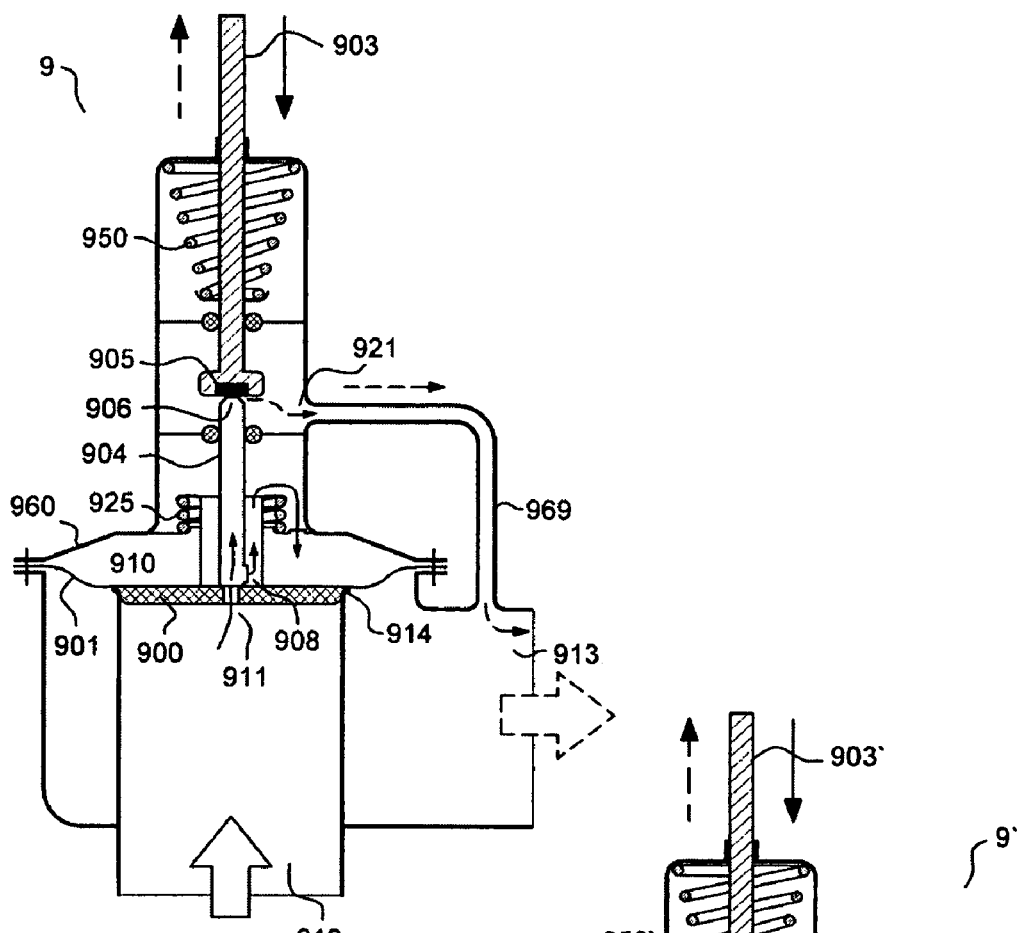
FIG. 11 and FIG. 11A show a cross-section top view of two versions of a fifth modality of the device of invention applied to a valve shown closed, with this kind of valve being of the type which operates under differential pressure and having a shuttering element in the main valve associated with a diaphragm.

FIG. 11 shows a fifth modality of the device of the invention joint to a main valve 9, which is depicted in closed position. The operation of this valve is similar to that described for valve of FIG. 6, except that in this case it is an automatic closing valve, since when the opening force stops operating on the axial commanding stem 903, the valve closes due to the action of a spring 950. In this fifth modality, the diaphragm 901 has a lifting power in the same direction but opposite to the restitution power of diaphragm 901 and of a magnitude which is equal to or higher than the restitution power of diaphragm 901. In this case, said lifting power is contributed by a lifting spring 925 which is directly linked with the main shutter 900. This lifting spring 925 has a lower support which is fixed to the internal part of the upper area 960 of the pressure chamber 910 and another support in a moving relationship which is joint to the upper central portion of the main shutter 900. When the commanding stem 903 is actuated to open valve 9 at any condition of pressure differential, that is low or high, the lifting spring disabling the restitution power of the diaphragm 901 allows the main shutter 900 be lifted from its seat 914 in the portion as determined by the commanding stem 903 and allowing the main valve operating at any pressure of the network, which is slightly higher than the downstream pressure, including slightly negative pressures or high pressures.

Figure 12:
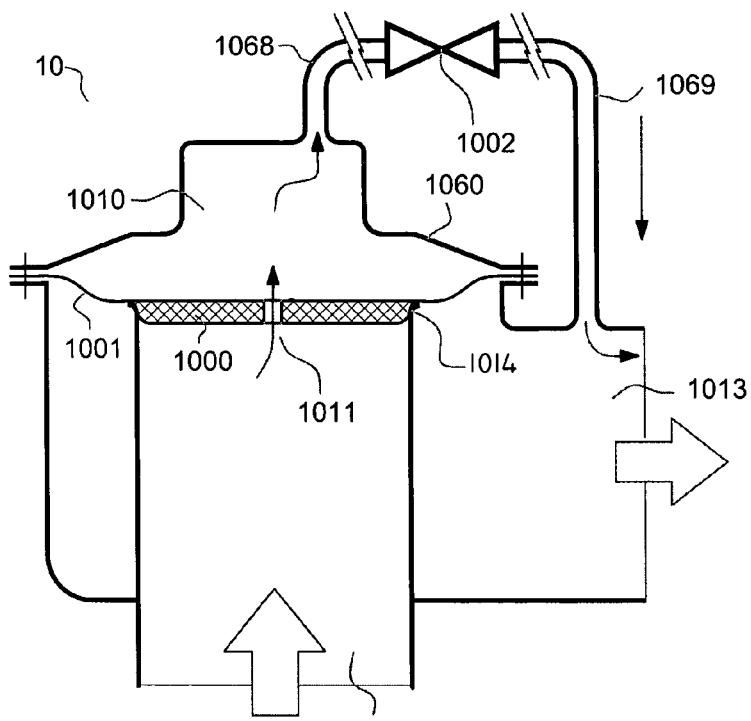
FIG. 12 shows a cross-section top view of a sixth modality of the device of invention applied to a valve shown closed, with this kind of valve being of the type which operates under differential pressure and having a shuttering element in the main valve associated with a diaphragm.

FIG. 12 shows a sixth modality of the device of the invention which is an integral part of a main valve 10 and which is depicted in closed position. In this sixth modality, the control of the internal pressure of pressure chamber 1010 of the main valve 10 is indirectly controlled by a secondary control valve 1002 connected to the pressure chamber 1010. Said secondary control valve 1002 may be mounted on or above the pressure chamber or in a remote condition to a pipe 1068 and discharges the control flow downstream the valve controlled by a pipe 1069. The main shutter 1000 has an opening 1011 in its central part for the entering of control flow, which communicates the main flow inlet 1012 with the pressure chamber 1010. The secondary control valve 1002 may be any valve of the state of the art allowing a fine, gradual and steady regulation between a minimum closed position and a maximum preset opened position. This secondary control valve 1002 may have commanding drives such as automatic opening, automatic closing, commanding stem fastening through brake or free commanding stem as already described.

The control for opening, closing or regulating the flow is directly related to the control flow rates which regulate the secondary control valve 1002 which in turn controls the internal pressure of the pressure chamber 1010 in a controlled and steady way. This modality does not allow the operation of the main valve 10 from low pressures, since it does not have a device allowing counteracting the restitution power of the diaphragm 1001 in the case of low pressures of flow.

Figure 13:
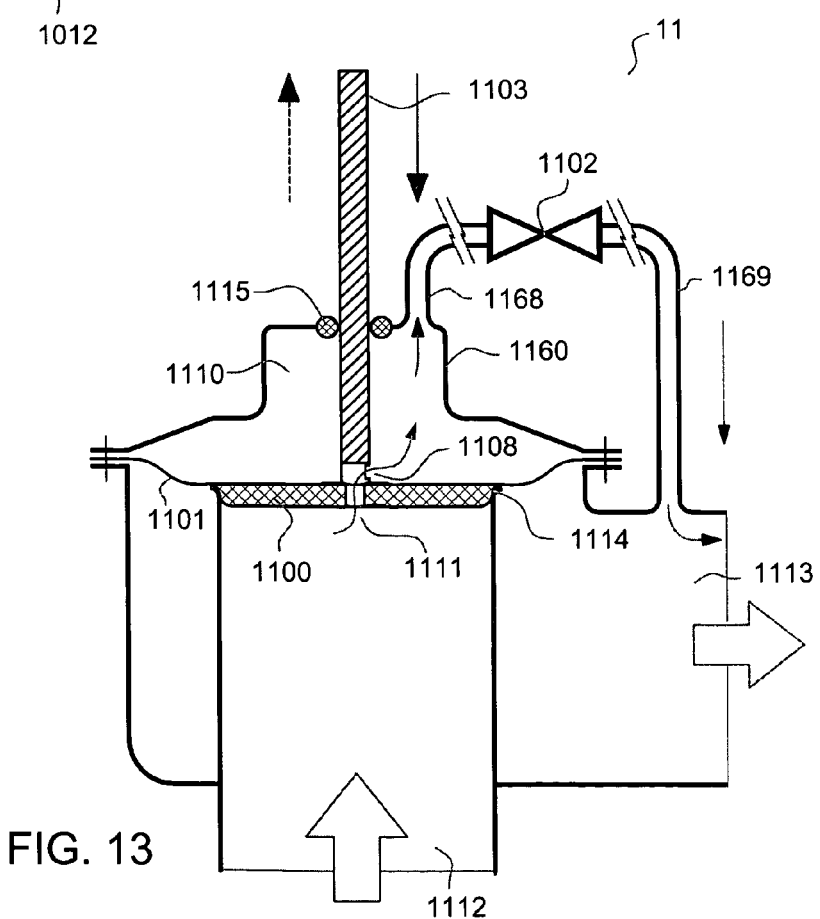
FIG. 13 shows a cross-section top view of a seventh modality of the device of invention applied to a valve shown closed, with this kind of valve being of the type which operates under differential pressure and having a shuttering element in the main valve associated with a diaphragm.

FIG. 13 shows a seventh modality of the device of the invention incorporated to the main valve 11 which is depicted in closed position. In this seventh modality which is substantially similar to the modality of FIG. 12, an axial commanding stem 1103 has been fixed in the center of the upper face of the main shutter 1100 and which projects outward by going though the upper area 1160, where the sealing means 1115 can be found. The axial commanding stem 1103 has an opening 1108 in its lower end which communicates the opening 1111 for the entering of the control flow with the pressure chamber 1110. The internal pressure control of the pressure chamber 1110 of the main valve 11 is indirectly controlled by a secondary control valve 1102 connected to the pressure chamber 1110. Said secondary control valve 1102 may be mounted on or above the pressure chamber or in a remote condition. The secondary control valve 1102 may be any valve of the state of the art allowing a fine, gradual and steady regulation between a minimum closed position and a maximum preset opened position. This valve may have commanding drives such as automatic opening, automatic closing, commanding stem fastening through brake or free commanding stem as already described.

The control for opening, closing or regulating the flow is directly related to the control flow rates which regulate the secondary control valve 1102 which in turn controls the internal pressure of the pressure chamber 1110 in a controlled and steady way. This modality allows the operation of the main valve 11 from low pressures. To this, the axial commanding stem 1103 should be actuated independently and along with the secondary control valve 1102, when the flow pressures are enough to overcome the restitution power of the shutter of the main valve 11, with the actuating of the axial commanding stem 1103 not being necessary.

The invention has been described on the basis of seven preferred modalities, where different combinations of some of its components have been considered, allowing a fine, gradual and steady regulation between a minimum closed position and a maximum preset opened position, and which may have commanding drives such as automatic opening, automatic closing, commanding stem fastening through brake or free commanding stem, being free to move between a closed and opened position and being able to define any intermediate position in a flexible way in order to operate main valves with operations for the opening, closing and regulating the main flow steadily.

In order to actuate the device, these secondary control valves which control the internal pressure of the pressure chamber of the main valve may indirectly actuate in the shutter of the main valve or connected to the main valve's pressure chamber, whether directly or remotely, or else actuate directly on the main valve's shutters with associated commanding stems which form part in some cases of said secondary control valves. These stems may have a free drive without mechanical link, free drive with mechanical link or drives with lifting power. The secondary control valves may be located outside or inside the main valve.

The devices may be actuated indirectly, directly or remotely by a manual, mechanical, hydraulic, electric, magnetic, thermal, expansion operation or by any other system of the state of the art.

Before the opening or openings for the control flow entering the pressure chamber, there may be filters or other devices preventing the blocking of such inlet openings.

In the case of valves which act indirectly on the main valve's shutters, the secondary control valves may have any kind of drive (radial, angular, axial, etc.). In the case of valves which act directly on the main valve's shutters with associated commanding stems which form part thereof, they shall be axially commanded. Thus, for example, we may have a normal radial but axially operated driving valve through a gearing element (secondary control valve with axial command).

The devices may act for main valves operating with flow pressures which are slightly lower than zero pressure, that is to say, negative or vacuum pressures. In these cases, the highest pressure of flow shall correspond to the main flow inlet, while the lowest one shall correspond to the main flow outlet.

The devices may discharge the control flow and/or main flow outward, to a chamber or a pipe for carrying the controlled flow.

Figure 11A:
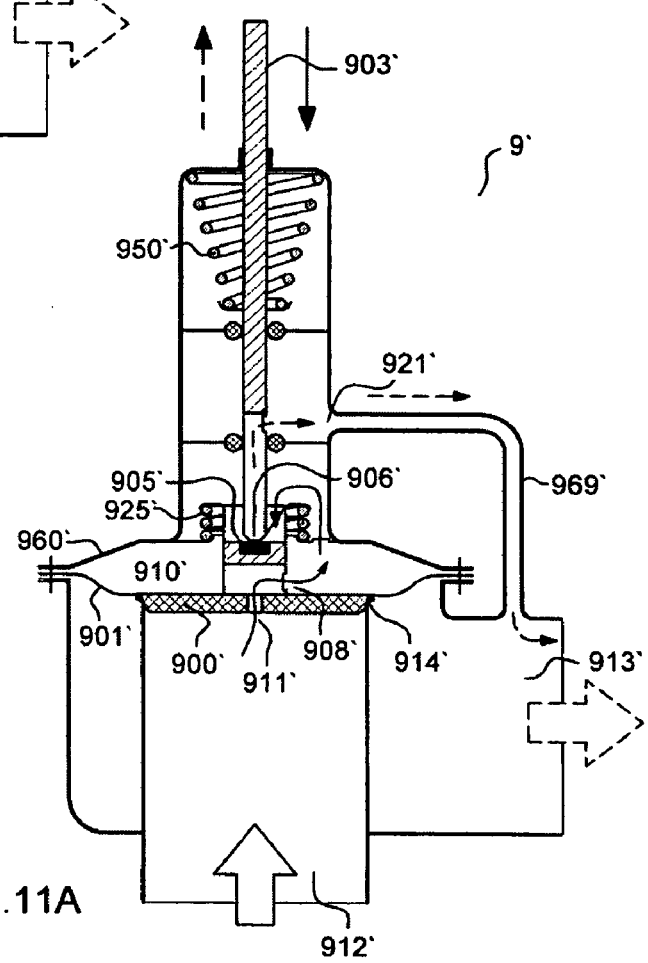

The shutters of the secondary control valve XX05, such as the seats of the secondary control valve XX06, may be inverted in relation to that shown by some embodiments of the invention, as for example that of FIG. 11, where the inlet for the main flow and inlet for the control flow, can be found in the axial axis of the main valve and the control valve can be found in the pressure chamber. As illustrated in FIG. 11A, the discharge of control flow takes place through a, axial commanding hollow stem 903' which discharges the control flow to the outside of downstream the controlled valve. The operation of the valve of FIG. 11A is equal to that of valve of FIG. 11.

In addition, in some versions of the invention, the inlet hole for the control flow XX11 into the corresponding pressure chamber XX10 may be replaced by an external pipe XX68, which takes the control flow from upstream of the controlled valve so as to introduce it through an inlet hole XX11 into de pressure chamber XX10.

The invention claimed is:

1. A valve for fluids operating under differential pressure, which receives a main inlet flow and releases a main outlet flow, comprising:

a main valve (1,4,5,7,9) having a main inlet (112,412, 512,712,912) and a main outlet (113,413,513,713,913) for fluid; said main inlet being equipped with a main valve seat (114,414,514,714,914) over which a main plug (100,400,500,700,900) is seated, with said main plug being displaceable in an axial direction, perpendicular to a sealing plane;

a control inlet (111,411,511,711,911), communicating with a pressure chamber (110,410,510,710,910), which carries the flow from upstream said main flow to said pressure chamber;

a control outlet (121,421,521,721,921), communicating with said pressure chamber, for allowing total or partial release of the flow control from said pressure chamber, with said control flow being discharged at a point located downstream said main outlet flow;

a secondary control valve, to regulate the control fluid in said pressure chamber, said secondary control valve being formed by an axially driven stem (103,403,503, 703,903) made up of a hollow portion and an end portion, where said stem drives the relative displacement between said main plug and said main seat, with one of the ends of said end portion being located beyond a body of said valve in order to allow said end portion to be driven from the outside;

said hollow portion is provided with two openings in their corresponding axial end, with said hollow portion being joint in one end to said main plug, with one of said two openings being located in the joint end to said main plug, being surrounded by said pressure chamber, and with another of said two openings being located outside said pressure chamber, from which said hollow portion goes out through an opening of said pressure chamber, being provided with a tight seal which allows axial displacement of said hollow portion;

said end portion is independent from and is axially aligned with said hollow portion, with one of the ends of said end portion being provided with a secondary plug portion to obstruct said another of said two openings which is located outside said pressure chamber;

an area, corresponding to said control inlet, being smaller than an area corresponding to said control outlet, so that the volume of flow through said control inlet is lower than the volume of flow through said control outlet, so that the control fluid may enter through said control inlet.

2. A valve for fluids as in claim 1, wherein said control inlet includes a duct (111,411,511,711,911) which communicates with said main inlet.

3. A valve for fluids as in claim 2, where said duct is made up of a small opening in said main plug which communicates with said pressure chamber.

4. A valve for fluids as in claim 1, where said end portion of said stem is joint to said hollow portion of said stem through a joint restricting means (724) to an upper portion of said hollow portion of said stem, so that sliding of said joint restricting means keeps said end portion of said stem within a preset range of axial displacement.

5. A valve for fluids operating under differential pressure, wherein said valve (3) comprises:

a main inlet for fluid (312) and a main outlet for fluid (313); with said main outlet for fluid being equipped with a main valve seat (314) over which a main plug (300) is seated, with said main plug being displaceable in an axial direction, perpendicular to a sealing plane;

said valve having a control inlet for fluids (311), from upstream, allowing control fluid passing to a pressure chamber (310) and having a control outlet for fluid (321) downstream, thus allowing the control fluid leaving said pressure chamber totally or partially; with the control fluid in said pressure chamber being regulated by a secondary control valve formed by an axially driven stem made up of at least a hollow portion and an end portion, where said stem drives the relative displacement between said main plug and said main seat of the valve; with one of the ends of said end portion of said stem being located beyond a body of said main valve in order to allow its driving from the outside, wherein:

said control outlet for fluid (321) is an opening located in said main plug;

said end portion of said stem is independent and is axially aligned with said opening for said control outlet of fluid located in said main plug; with one of the ends of said end portion of said stem being provided with a secondary plug for obstructing said opening of said control outlet and the other end of said end portion of said stem being located outside said pressure chamber, from which it goes out through an opening in said pressure chamber provided with a tight seal which allows the axial displacement of said end portion of said stem; and an area corresponding to the inlet of control fluid is smaller than an area corresponding to the outlet of the control fluid, so that the volume of flow of inlet of control fluid is lower than the volume, of flow of discharge of the control fluid.

6. A valve for fluids operating under differential pressure, wherein said valve (9') comprises:

a main inlet for fluid (912') and a main outlet for fluid (913'); with said main inlet for fluid being equipped with a main valve seat (914') over which a main plug (900') is seated, with said main plug being displaceable in an axial direction, perpendicular to a sealing plane;

said valve for fluids also having a control inlet for fluids from upstream, which is a small duct or opening (911') in said main plug allowing said control fluid passing to a pressure chamber (910') and having a control outlet (921') for fluid downstream, thus allowing control fluid leaving said pressure chamber totally or partially; with the control fluid in said pressure chamber being regulated by a secondary control valve formed by an axially driven stem made up of a hollow portion and an end portion, which is jointly and axially placed as regards said hollow portion; with one of the ends of said end portion of the stem being located beyond the body of said main valve in order to allow its driving from the outside, wherein:

said hollow portion of said stem is provided with two openings in their corresponding axial end, with one of the openings of said hollow portion of said stem, which is located in the joint end to said main plug, being surrounded by said pressure chamber; and with the other of said openings at the other end of said hollow portion of said stem joint to said end portion of said stem being located outside said pressure chamber, from which it goes out through an opening of said pressure chamber, being provided with a tight seal which allows the axial displacement of said hollow portion of said stem;

said main plug has a secondary plug (905') joint to and at a fixed preset distance from a main wall of said main plug on its side facing said pressure chamber, so that said secondary plug will obstruct said opening of said hollow portion of said stem located in a farthest end of said joint to said end portion when placed in axial contact; and an area corresponding to said inlet of control fluid is smaller than an area corresponding to said outlet of the control fluid, so that the volume of flow of inlet of control fluid is lower than the volume of flow of discharge of the control fluid.

* * * * *